United States Patent
Snell et al.

(10) Patent No.: US 8,119,714 B2
(45) Date of Patent: Feb. 21, 2012

(54) MULTI-LAYER GOLF BALL PROVIDING IMPROVED SPEED

(75) Inventors: Dean A. Snell, Oceanside, CA (US); Hyun Jin Kim, Carlsbad, CA (US); Eric Loper, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 12/708,414

(22) Filed: Feb. 18, 2010

(65) Prior Publication Data

US 2010/0167843 A1 Jul. 1, 2010

Related U.S. Application Data

(62) Division of application No. 11/133,924, filed on May 18, 2005, now abandoned.

(60) Provisional application No. 60/572,432, filed on May 19, 2004.

(51) Int. Cl.
*A63B 37/00* (2006.01)
*A63B 37/06* (2006.01)

(52) U.S. Cl. ........ 524/322; 524/394; 524/399; 524/400; 525/221; 473/373; 473/374; 473/376

(58) Field of Classification Search .......................... None
See application file for complete search history.

(56) References Cited

U.S. PATENT DOCUMENTS

| | | | |
|---|---|---|---|
| 4,431,193 A | 2/1984 | Nesbitt | |
| 5,306,760 A | 4/1994 | Sullivan | |
| 5,312,857 A | 5/1994 | Sullivan | |
| 5,779,562 A * | 7/1998 | Melvin et al. | 473/373 |
| 5,789,475 A | 8/1998 | Chen | |
| 5,973,046 A | 10/1999 | Chen et al. | |
| 6,042,488 A * | 3/2000 | Sullivan et al. | 473/374 |
| 6,100,321 A | 8/2000 | Chen | |
| 6,329,458 B1 | 12/2001 | Takesue et al. | |
| 6,368,237 B1 | 4/2002 | Sullivan | |
| 6,416,424 B2 | 7/2002 | Sullivan | |
| 6,419,594 B1 | 7/2002 | Nesbitt et al. | |
| 6,503,156 B1 | 1/2003 | Sullivan | |
| 6,506,130 B2 | 1/2003 | Sullivan | |
| 6,616,552 B2 | 9/2003 | Takesue et al. | |
| 6,653,382 B1 | 11/2003 | Statz et al. | |
| 6,777,472 B1 | 8/2004 | Statz et al. | |
| 6,815,480 B2 | 11/2004 | Statz et al. | |
| 6,962,951 B1 | 11/2005 | Takesue et al. | |
| 7,182,703 B2 | 2/2007 | Emerson et al. | |
| 2001/0019971 A1 | 9/2001 | Hayashi et al. | |
| 2001/0046906 A1 | 11/2001 | Rajagopalan et al. | |
| 2002/0037968 A1 * | 3/2002 | Chen | 525/194 |
| 2002/0065149 A1 | 5/2002 | Tzivanis et al. | |
| 2002/0193181 A1 | 12/2002 | Kennedy et al. | |
| 2003/0008975 A1 | 1/2003 | Takesue et al. | |
| 2003/0017888 A1 | 1/2003 | Higuchi et al. | |
| 2003/0060307 A1 | 3/2003 | Umezawa et al. | |
| 2003/0148827 A1 * | 8/2003 | Sullivan et al. | 473/371 |
| 2003/0158312 A1 | 8/2003 | Chen | |
| 2003/0190976 A1 * | 10/2003 | Binette et al. | 473/354 |
| 2004/0018892 A1 * | 1/2004 | Nanba et al. | 473/371 |
| 2004/0033847 A1 * | 2/2004 | Higuchi et al. | 473/371 |
| 2004/0106474 A1 | 6/2004 | Hayashi et al. | |
| 2004/0161623 A1 | 8/2004 | Domine et al. | |
| 2004/0230006 A1 | 11/2004 | Voorheis et al. | |

OTHER PUBLICATIONS

Thain, *Science and Golf IV*, pp. 319-327, Jul. 2002.

* cited by examiner

*Primary Examiner* — David Buttner
(74) *Attorney, Agent, or Firm* — Klarquist Sparkman, LLP

(57) ABSTRACT

The present invention is directed to a multi-layer golf ball comprising at least one core or core layer, at least one intermediate layer, and at least one cover layer. The core has a diameter of about 1.20 to about 1.56 in. and a PGA compression of about 40 to about 90. The intermediate layer comprises a modified ionomeric polymer, and it has a thickness of about 0.01 to about 0.10 in. and a Shore D hardness of about 30 to about 70. The cover layer has a Shore D hardness of about 40 to about 75. The multi-layer golf balls of the present invention provide high driver ball speed and/or a high Coefficient of Restitution, while maintaining excellent shot feel.

33 Claims, 1 Drawing Sheet

MULTI-LAYER GOLF BALL PROVIDING IMPROVED SPEED

CROSS-REFERENCE TO RELATED APPLICATIONS

This is a divisional of U.S. patent application Ser. No. 11/133,924, filed May 18, 2005, now abandoned, which claims the benefit of U.S. Provisional Patent Application No. 60/572,432, filed May 19, 2004, both of which are hereby incorporated by reference.

BACKGROUND OF THE INVENTION

This invention relates generally to golf balls, and, more specifically, to multi-layer golf balls. In particular, this invention relates to a golf ball having a core, at least one intermediate layer, acid at least one cover layer, wherein the intermediate layer comprises an ionomer, or ionomer blend, and further comprises at least one fatty acid or metal salt thereof. The multi-layer golf balls of the present invention provide a higher ball speed and/or a higher coefficient of restitution ("C.O.R.") than do analogous balls having an identical core and cover layer, but an intermediate layer made from the identical ionomers or ionomer blends but lacking the fatty acid or metal salt.

Until recently, golf balls typically were divided into two general types or groups: 1) two-piece balls, and 2) wound balls (also known as three-piece balls). The difference in the play characteristics of these two types of balls can be quite significant.

Wound balls typically have either a solid rubber, or liquid-filled, center around which many yards of a stretched elastic thread or yarn is wound to form a core. The wound core then is covered with a durable cover material, e.g., an ionomer or other thermoplastic material or a softer cover such as balata or cast polyurethane. Wound balls generally are softer than two-piece balls, and they provide more spin, which enables a skilled golfer to have more control over the ball's flight. In particular, it is desirable for the golfer to be able to impart backspin to the ball, for purposes of controlling its flight and controlling the action of the ball upon landing on the ground. For example, substantial backspin will make the ball stop once it strikes the landing surface instead of bounding forward. The ability to impart backspin onto a golf ball is related to the extent to which the golf ball's cover deforms when it is struck by a golf club. Because conventional wound balls are generally more deformable than are conventional two-piece balls, it is easier to impart spin to wound balls. However, higher spinning wound balls typically travel a shorter distance when struck, as compared to two-piece balls. Moreover, because wound balls generally have a more complex structure, they generally require a longer time to manufacture and are more expensive to produce than are two-piece balls.

Golf balls having a two-piece construction generally are most popular with the recreational golfer, because they are relatively durable and provide maximum distance. Two-piece balls have a single solid core, usually formed of a cross-linked rubber, which is encased by a cover. Typically, the solid core is made of polybutadiene, which is chemically cross-linked with peroxide, or sulfur compounds together with co-cross-linking agent, such as zinc diacrylate. The cover of such balls often comprises tough, cut-proof blends of one or more materials known as ionomers, which typically are ethylene/acrylic acid copolymers or ethylene/acrylic acid/acrylate terpolymers in which some or all of the acid groups are neutralized with metal cations. Such ionomers are commercially available under trademarks such as SURLYN®, which are resins sold commercially by DuPont, of Wilmington, Del., or IOTEK® which is sold commercially by ExxonMobil, of Irving, Tex.

The combination of the above-described core and cover materials provides a "hard" covered ball that is resistant to cutting and other damage caused by striking the ball with a golf club. Further, such a combination imparts a high initial velocity to the ball, which results in increased distance. Due to their hardness, however, these two-piece balls have a relatively low spin rate, which makes them difficult to control, particularly on relatively short approach shots. As such, these balls generally are considered to be "distance" balls. Because the materials of two-piece balls are very rigid, the balls typically have a hard "feel" when struck by a club. Softer cover materials, e.g., balata or softer ionomers or polyurethanes in some instances, have been employed in two-piece balls in order to provide improved "feel" and increased spin rates, although sometimes with a reduction the ball's speed or C.O.R.

The C.O.R. of a one-piece golf ball is a function of it's composition. In two-piece golf balls and multi-layered golf balls, the C.O.R is a function of the various properties of the core, the cover, and any additional layer. Although the United States Golf Association (U.S.G.A.) has not promulgated any limitations on the C.O.R. values for golf balls, it has instituted a rule prohibiting the competitive use in any U.S.G.A.-sanctioned event of a golf ball that can achieve an initial velocity greater than 76.2 meters per second (m/s), or 250 ft/s, when struck by a golf club driver having a velocity of 39.6 m/s, i.e., 130 ft/s (referred to (hereinafter as "the U.S.G.A. test"). However, an allowed tolerance of two percent permits manufacturers to produce golf balls that achieve an initial velocity of 77.7 m/s (255 ft/s).

Regardless of the form of the golf ball, players generally seek a ball that delivers maximum distance, which requires a high initial velocity upon impact. Therefore, in an effort to meet the demands of the marketplace, golf ball manufacturers strive to produce balls delivering initial velocities in the U.S.G.A. test that approximate the U.S.G.A. maximum of 77.7 m/s, or 255 ft/s, as closely as possible. Golf ball manufacturers also generally strive to maximize the ball's C.O.R. without violating the velocity limitation. Also, to maximize distance, it is advantageous if the balls have a lower driver spin rate. Finally it is highly desirable if, while providing increased velocity and distance, the balls also will exhibit a soft shot feel.

Recently, several golf ball manufacturers have introduced multi-layer balls, i.e., balls having at least a core, an intermediate layer or mantle, and one or more cover layers. The goal of these manufacturers has been to overcome some of the undesirable aspects of conventional two-piece balls, e.g., their hard feel. Such a multi-layer structure allows the introduction of new materials of varying hardness, whereby deficiencies in a property in one layer can be mitigated by the introduction of a different material in another layer. For example, to optimize ball hardness and "feel," blends of copolymeric high-acid ionomers with softer terpolymeric ionomers have been used as a layer material in a golf ball but again, often with a concurrent loss of C.O.R. and/or speed.

Numerous examples of multi-layer combinations are available. For example, U.S. Pat. No. 4,431,193 discloses a golf ball having a multi-layer cover, in which the inner cover layer is a relatively hard, high flexural modulus ionomer resin and the outer cover layer is a relatively soft, low flexural modulus ionomer resin.

Also, U.S. Pat. No. 6,368,237 discloses a multi-layer golf ball comprising a core, an inner cover layer, and an outer cover layer. The inner cover layer comprises a high-acid ionomer or ionomer blend. The outer cover layer comprises a soft, very low-modulus ionomer or ionomer blend, or a non-ionomeric thermoplastic elastomer such as polyurethane, polyester, or polyesteramide. The resulting multi-layer golf ball is said to provide an enhanced distance without sacrificing playability or durability when compared to known multi-layer golf balls.

U.S. Pat. Nos. 6,416,424, 6,416,424, and 6,419,594, likewise, disclose multi-layer golf balls comprising a core, an inner cover layer, and an outer cover layer. The inner cover layer comprises a low-acid ionomer blend. The outer cover layer comprises a soft, very low modulus ionomer or ionomer blend, or a non-ionomeric thermoplastic elastomer such as polyurethane, polyester, or polyesteramide. The resulting multi-layer golf ball is said to provide an enhanced distance without sacrificing playability or durability when compared to known multi-layer golf balls.

U.S. Pat. Nos. 6,503,156 and 6,506,130, likewise, disclose multi-layer golf balls comprising a core, an inner cover layer, and an outer cover layer. The inner cover layer comprises a low-acid ionomer blend. The outer cover layer comprises a soft, non-ionomeric thermoplastic or thermosetting elastomer such as polyurethane, polyester, or polyesteramide. The resulting multi-layered golf ball is said to provide an enhanced distance without sacrificing playability or durability when compared to known multi-layer golf balls.

Another approach to optimizing golf ball performance has been to incorporate selected additives into the polymer compositions used to make the various ball layers, in order to modify the polymer properties. Such additives include the metal salts of various fatty acids. For example, U.S. Pat. Nos. 5,312,857 and 5,306,760 disclose cover compositions for golf ball construction comprising mixtures of ionomer resins and 25-100 parts by weight of various fatty acid salts (i.e., metal stearates, metal oleates, metal palmitates, metal pelargonates, metal laurates, etc.). However, the patents fail to disclose any major effects on ball properties, and fail to disclose that the compositions are useful for parts of a golf ball other than the cover.

Recent attempts to extend the concept of the use of multi-layer covers to mitigate the harsh feel of the harder ionomer materials have also resulted in the development of modified ionomers for use in golf ball compositions. For instance, U.S. Pat. No. 6,100,321 and U.S. Patent Publication No. 2003/0158312 A1 disclose ionomer compositions that are modified with 25 to 100 parts by weight of a fatty acid salt such as a metal stearate, for producing golf balls having good resilience and high softness. Unlike the earlier-mentioned patents, which have employed metal stearates as a filler material, U.S. Pat. No. 6,100,321 and U.S. Patent Publication No. 2003/0158312 A1 contemplates the use of relatively low levels of a stearic acid moiety, particularly metal stearates, to modify ionomers to produce improved resilience for a given level of hardness or PGA Compression values. The stearate-modified ionomers are taught as being especially useful when the ionomer is formulated for use as a golf ball core or center, as a one-piece golf ball, or as a soft golf ball cover. However, there is no disclosure of any ball construction parameters required to produce specific performance properties such as driver velocity or driver spin for three-piece balls.

Subsequent patents have furthered the use of such modified ionomers in golf ball covers. For example, U.S. Pat. No. 6,329,458 discloses a golf ball cover comprising an ionomer resin and a metal "soap," e.g., calcium stearate. Finally, U.S. Pat. No. 6,616,552 discloses a golf ball including a multi-layer cover, one layer of which includes a heated mixture of an ionomer resin and a metal salt of a fatty acid, e.g., calcium stearate.

It should be appreciated from the foregoing description that there remains a need for a golf ball that can provide maximum C.O.R. without violating the velocity limitation. Also, to maximize distance, it is desirable for such balls to have a lower driver spin rate and to exhibit a soft shot feel. The present invention satisfies this need.

SUMMARY OF THE INVENTION

The present invention is embodied in a multi-piece golf ball having a core, an intermediate layer, and a cover layer, wherein the ball provides a high driver ball speed and/or a high Coefficient of Restitution ("C.O.R."), while maintaining excellent shot feel. More particularly, the intermediate layer of the ball comprises a modified ionomeric polymer that comprises a special blend composition and/or a special bimodal polymer blend composition. The special blend composition comprises: (1) ethylene, (2) 5 to 25 weight percent (meth) acrylic acid (based on the total weight of (1), (2), and (3)), (3) 0 to 40 weight percent of a $C_1$ to $C_8$-alkyl acrylate (based on the total weight of (1), (2), and (3)), and (4) about 5 to about 45 weight percent (based on the total weight of the modified ionomeric polymer), of a fatty acid or one or more metal salts of the fatty acid. The special bimodal polymer blend composition comprises (1) a high molecular weight component having molecular weight of about 80,000 to about 500,000 and comprising one or more ethylene/$\alpha$, $\beta$-ethylenically unsaturated $C_{3-8}$ carboxylic acid copolymers and/or one or more ethylene/alkyl (meth)acrylate/(meth)acrylic acid terpolymers; the high molecular weight component being partially neutralized with metal ions selected from the group consisting of lithium, sodium, zinc, calcium, magnesium, and a mixture of any these, and/or (2) a low molecular weight component having a molecular weight of about from about 2,000 to about 30,000 and comprising one or more ethylene/ $\alpha,\beta$-ethylenically unsaturated $C_{3-8}$ carboxylic acid copolymers and/or one or more ethylene, alkyl(meth)acrylate, (meth)acrylic acid terpolymers; the low molecular weight component being partially neutralized with metal ions selected from the group consisting of lithium, sodium, zinc, calcium, magnesium, and a mixture of any these, and (3) about 5 to about 45 weight percent (based on the total weight of the modified ionomeric polymer) of a fatty acid or one or more metal salts of the fatty acid. At least about 40 percent of the acid groups present in the modified ionomeric polymer are neutralized with zinc, sodium, lithium, calcium, or magnesium ions, or a combination thereof.

In addition, the core has a diameter in the range of preferably about 1.20 to about 1.56 in., more preferably about 1.40 to about 1.52 in., and most preferably about 1.45 to about 1.50 in. The core also has a PGA compression in the range of preferably about 40 to about 90, more preferably about 40 to about 85, and most preferably about 40 to about 80.

The intermediate layer has a thickness in the range of preferably about 0.01 to about 0.10 in., more preferably about 0.02 to about 0.08 in., and most preferably about 0.03 to about 0.06 in. The intermediate layer has a Shore D hardness in the range of preferably about 30 to about 75, more preferably about 40 to about 70, and most preferably about 40 to about 65. The modified ionomeric polymer present in the intermediate layer comprises preferably about 7 to about 35 weight percent, and more preferably about 8 to about 20 weight percent, (based on the total weight of the modified ionomeric polymer) of one or more metal fatty acids or metal salts of a fatty acid, wherein the metal is selected from the group consisting of calcium, sodium, zinc, lithium, magnesium, barium, and combinations thereof. Preferably about 50 to 100 percent, and more preferably about 70 to 100 percent, of the acid groups present in the modified ionomeric polymer present in the intermediate layer are neutralized with zinc, sodium, lithium, calcium, or magnesium ions, or a combination thereof. The preferred average acid content is in the range of about 5 to about 25 weight percent.

The cover layer has a Shore D hardness in the range of preferably about 40 to about 70, more preferably about 45 to about 70, and most preferably about 50 to about 70.

In other more detailed features of the invention, the modified ionomeric polymer of the intermediate layer further comprises a zinc-neutralized ionomer of a polymer having the general formula E/X/Y, where E is ethylene, X is an alkyl (meth)acrylate present in an amount in the range of 0 to about 50 weight percent (based on the total weight of the zinc-neutralized ionomer), and Y is (meth)acrylic acid present in an amount in the range of about 5 to about 25 weight percent (based on the total weight of the zinc-neutralized ionomer).

In yet another more detailed feature of the invention, the core further comprises (1) at least one unsaturated polymer, (2) at least one cross-linking agent, and (3) at least one co-cross-linking agent. The unsaturated polymer has a Mooney viscosity ($ML_{1+4}$ (100° C.)) in the range of about 20 to about 80 and is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, polyurethane, any combinations thereof. In addition, the cross-linking agent is present in an amount in the range of about 0.05 to about 5 parts by weight of the cross-linking agents per 100 parts by weight of the unsaturated polymer.

Further, the core can optionally comprise a peptizer, an accelerator, and/or a filler. The optional peptizer can comprise an organic sulfur compound, a metal salt of an organic sulfur compound, and/or a non-metal salt of an organic sulfur compound. The optional accelerator can be present in an amount in the range of about 0.1 to about 10 parts by weight per 100 parts by weight of the unsaturated polymer. The optional filler is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, other particulate carbonaceous materials, and combinations thereof.

In yet other more detailed features of the invention, the unsaturated polymer is cis-1,4-polybutadiene and has a Mooney viscosity ($M_{1+4}$ (100° C.)) in the range of about 30 to about 70, and the cross-linking agent is present in an amount in the range of about 0.2 to about 3 parts by weight per 100 parts by weight of the unsaturated polymer. The optional peptizer comprises an organic sulfur compound or metal salt of an organic sulfur compound, or a non-metal salt of an organic sulfur compound, present in an amount in the range of about 0.01 to about 10 parts by weight per 100 parts by weight of the unsaturated polymer. Also in this case, the optional accelerator is present in an amount in the range of about 0.2 to about 5 parts by weight per 100 parts by weight of the unsaturated polymer.

More particularly, the unsaturated polymer is cis-1,4-polybutadiene and has a Mooney viscosity ($ML_{1+4}$ (100° C.)) in the range of about 35 to about 50, and the cross-linking agent is present in an amount in the range of about 0.2 to about 2 parts by weight per 100 parts by weight of the unsaturated polymer. In this case, the optional peptizer comprises pentachlorothiophenol, dibenzamido diphenyldisulfide, a metal salt of pentachloro-thiophenol, or an ammonium salt of pentachlorothiophenol, or a combination thereof, present in an amount in the range of about 0.1 to about 7 parts by weight per 100 parts by weight of the unsaturated polymer. Preferably, the peptizer is the $NH_4^+$ salt of pentachlorothiophenol, present in amount in the range of about 0.15 to about 5 parts by weight per 100 parts by weight of the unsaturated polymer. Also in this case, the optional accelerator is present in an amount in the range of about 0.5 to about 1.5 parts by weight per 100 parts by weight of the unsaturated polymer, and wherein the accelerator is selected from the group consisting of 2-mercaptobenzothiazole and a salt of 2-mercaptobenzothiazole.

The core preferably comprises a first cross-linking agent having a first characteristic decomposition temperature less than 150° C. for a $t_{1/2}$ equal to 0.1 hour, and a second cross-linking agent having a second characteristic decomposition temperature greater than 150° C. for a $t_{1/2}$ equal to 0.1 hour. The composition weight ratio of the first cross-linking agent to the second cross-linking agent is in the range of preferably 5:95 to 95:5, and more preferably 10:90 to 50:50.

The golf ball of the invention preferably has a coefficient of restitution greater than about 0.790, at 125 ft/sec inbound velocity. In addition, one or more of the core, the intermediate layer, and the cover layer preferably further comprises a polymer selected from the group consisting of thermoplastic elastomers, thermoset elastomers, synthetic rubber, thermoplastic vulcanizates, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane, or any metallocene-catalyzed polymers of these species.

The core can comprise a center and one or more core layers disposed around such center. The difference between the hardnesses of one core layer and the next adjacent core layer is preferably greater than 2 Shore D units. This hardness difference can increase outwards, from the center to the outermost core layer. Alternatively, this hardness difference can decrease outwards, from the center to the outermost core layer. The difference between the specific gravity of one core layer and the next adjacent layer preferably is greater than 0.1, and more preferably is greater than 0.2. This specific gravity difference can increase outwards, from the center to the outermost core layer. Alternatively, this specific gravity difference can decrease outwards, from the center to the outermost core layer.

The cover layer can comprise an ionomeric polymer comprising one or more E/X/Y copolymers, wherein E is ethylene, X is a $C_3$ to $C_8$ α,β ethylenically unsaturated carboxylic acid, and Y is a softening comonomer selected from the group consisting of alkyl acrylate and alkyl methacrylate, wherein the alkyl groups have from 1 to 8 carbon atoms, or ionomers of such E/X/Y copolymers, wherein X is in the range of about 5 to about 35 weight % of the E/X/Y copolymer and Y is in the range of 0 to about 50 weight % of the E/X/Y copolymer, and wherein the acid groups present in said ionomeric polymer are partially neutralized with a metal selected from the group consisting of zinc, sodium, lithium, calcium, magnesium, and combinations thereof. Alternatively, the cover layer may comprise a bimodal ionomeric polymer comprising a high molecular weight component having a molecular weight in the range of about 80,000 to about 500,000 and comprising one or more ethylene/α,β-ethylenically unsaturated $C_{3-8}$ carboxylic acid copolymers and/or one or more ethylene/alkyl (meth)acrylate/(meth)acrylic acid terpolymers, wherein the high molecular weight component is partially neutralized with metal ions selected from the group consisting of lithium, sodium, zinc, calcium, magnesium, and combinations thereof, and a low molecular weight component having a molecular weight in the range of about 2,000 to about 30,000 and comprising one or more ethylene/α,β-ethylenically unsaturated $C_{3-8}$ carboxylic acid copolymers and/or one or more ethylene/alkyl(meth)acrylate/(meth)acrylic acid terpolymers, wherein said low molecular weight component is partially neutralized with metal ions selected from the group consisting of lithium, sodium, zinc, calcium, magnesium. The cover layer may also comprise a mixture of an ionomeric polymer and a bimodal ionomeric polymer.

In other more detailed features of the invention, the cover layer in addition to an ionomeric or bimodal ionomeric polymer may further comprise a zinc-neutralized ionomer of a polymer having the general formula E/X/Y, where E is ethylene, X is an alkyl (meth)acrylate present in an amount in the range of 0 to about 50 weight percent (based on the total weight of the zinc-neutralized ionomer), and Y is (meth) acrylic acid present in an amount in the range of about 5 to about 25 weight percent (based on the total weight of the zinc-neutralized ionomer).

Other features and advantages of the present invention should become apparent from the following description of the preferred embodiment, taken in conjunction with the accompanying drawings, which illustrates, by way of example, the principles of the invention.

BRIEF DESCRIPTION OF THE DRAWING

The FIGURE is a cross-sectional view of a golf ball embodying the invention, illustrating the ball's core, intermediate layer, and cover layer.

DESCRIPTION OF THE PREFERRED EMBODIMENTS

Figure 1:
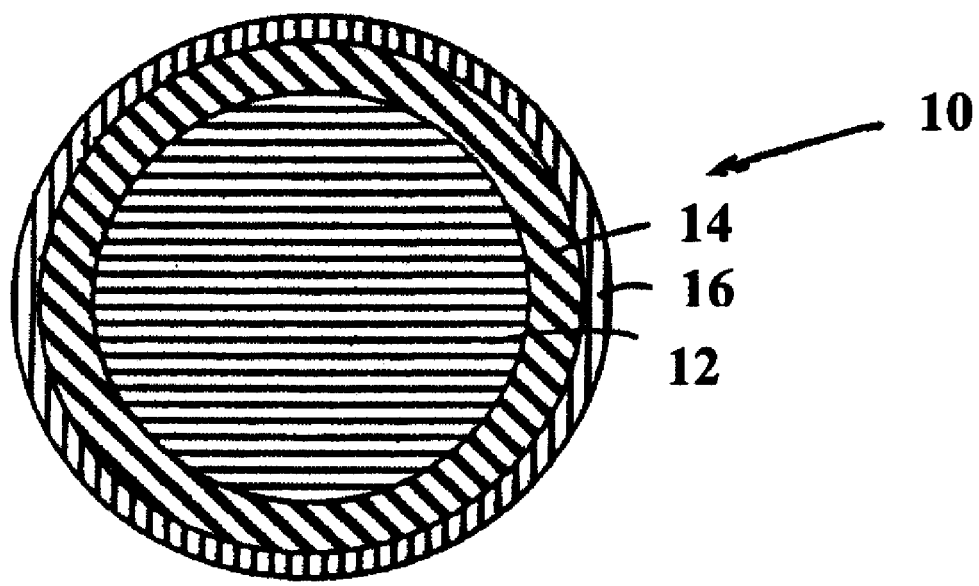

Any numerical values recited herein include all values from the lower value to the upper value in increments of one unit, provided that there is a separation of at least 2 units between any lower value and any higher value. As an example, if it is specified that the amount of a component or a value of a process variable preferably is from 1 to 90, more preferably from 20 to 80, and most preferably from 30 to 70, it is intended that values such as 15 to 85, 22 to 68, 43 to 51, 30 to 32 etc. are expressly included in this specification. For values having less than one unit difference, one unit is considered to be 0.1, 0.01, 0.001, or 0.0001, as appropriate. Thus all possible combinations of numerical values between the lowest value and the highest value enumerated herein should be considered to be expressly stated in this application.

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer having a degree of neutralization of less than 100 percent.

The term "hydrocarbyl" is intended to mean any aliphatic, cycloaliphatic, aromatic, aryl-substituted aliphatic, aryl-substituted cycloaliphatic, aliphatic-substituted aromatic, or cycloaliphatic-substituted aromatic groups. The aliphatic or cycloaliphatic groups are preferably saturated. Likewise, the term "hydrocarbyloxy" is intended to mean a hydrocarbyl group having an oxygen linkage between it and the carbon atom to which it is attached.

The term "outer cover layer" is used interchangeably with the term "cover layer" and is intended to mean the outermost layer of a golf ball.

The term "core" is intended to mean the elastic center of the golf ball. The core may have one or more layers of elastic material, which are usually made of rubbery material such as diene rubbers.

The term "cover layer" is intended to mean the outermost layer of the golf ball, which is the layer that is directly in contact with paint and/or ink on the ball's outer surface. If the cover includes two or more layers, only the outermost layer is designated the cover layer and the remaining layers (excluding the outermost layer) are commonly designated intermediate layers as herein defined.

The term "intermediate layer" is used interchangeably with the term "mantle layer" or "inner cover layer," and it is intended to refer to any layer(s) in a golf ball disposed between the core and the cover layer. With respect to the optimization of the thickness and hardness of the intermediate layer defined herein, when a plurality of inner layers are included, the thickness and hardness of all the inner layers combined are referred to.

Golf Ball Core

Referring to now to the FIGURE, there is illustrated a golf ball 10 that includes a solid center or core 12, formed as a solid, spherical body of the formulation described below. This core comprises the following components:

a) Unsaturated Polymer

The core 12 of the golf ball 10 of the present invention comprises an unsaturated polymer. Unsaturated polymers suitable for use in the golf balls of the present invention include any polymeric material having an unsaturation, either hydrocarbon or non-hydrocarbon, capable of participating in a cross-linking reaction initiated thermally, chemically, by irradiation, or by a combination of these methods. The unsaturated polymer can be any rubber commonly used in conventional one-piece golf balls and the cores of multi-layered golf balls. Non-limiting examples of suitable unsaturated polymers include 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these.

Polybutadiene rubbers, especially 1,4-polybutadiene rubbers containing at least 40 mol %, and more preferably 80 to 100 mol % of cis-1,4 bonds, are preferred, because of their high rebound resilience, moldability, and high strength after vulcanization. The polybutadiene component may be synthesized using rare earth-based catalysts, nickel-based catalysts, or cobalt-based catalysts, as conventionally used in this field.

Polybutadiene obtained using lanthanum rare earth-based catalysts is usually synthesized by polymerizing butadiene in the presence of a catalyst comprising a combination of a lanthanum rare earth compound, an organic aluminum compound, a Lewis base and, when necessary, a Lewis acid. The lanthanum rare earth compound may be a compound containing a rare earth atom (atomic number of 57 to 71), but particularly preferred is a neodymium compound.

Examples of the nickel-based catalysts include one-component types such as nickel diatomaceous earth, two-component types such as Raney-nickel/titanium tetrachloride, and three-component types such as a nickel compound/organic metal/boron trifluoride etherate. Examples of nickel compounds include reduced nickel with carrier, Raney-nickel, nickel oxide, nickel carboxylate, and a complex salt of organic nickel. Examples of the organic metals include a trialkyl aluminum such as triethyl aluminum, tri-n-propyl aluminum, tri-isobutyl aluminum, or tri-n-hexyl aluminum; an alkyl lithium such as n-butyl lithium, sec-butyl lithium, tert-butyl lithium, or 1,4-dibutane lithium; and a dialkyl zinc such as diethyl zinc or dibutyl zinc.

Examples of the cobalt-based catalysts include, as cobalt and compounds thereof, Raney-cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyl dithiocarbamate, cobalt anilinium nitrite, and cobalt dinitrosyl chloride. In particular, each of these compounds is preferably combined with a dialkyl aluminum monochloride such as diethyl aluminum monochloride or diisobutyl aluminum monochloride, a trialkyl aluminum such as triethyl aluminum, tri-n-propyl aluminum, tri-isobutyl aluminum or tri-n-hexyl aluminum, an aluminum alkyl sesquichloride such as ethyl aluminum sesquichloride, or aluminum chloride.

The 1,4-polybutadiene rubbers have a molecular weight distribution (Mw/Mn) preferably in the range of about 1.2 to about 4.0, more preferably about 1.7 to about 3.7, even more preferably about 2.0 to about 3.5, and most preferably from about 2.2 to about 3.2.

The polybutadiene rubbers have a Mooney viscosity (ML1+4 (100° C.)) in the range of preferably about 20 to about 80, more preferably about 30 to about 70, even more preferably about 35 to about 60, and most preferably about 35 to about 50.

The term "Mooney viscosity" used herein is intended to refer to an industrial index of viscosity, as measured by a Mooney viscometer, which is a type of rotary plastometer (see JIS K6300). This value is represented by the symbol ML1+4 (100° C.), wherein "M" represents Mooney viscosity, "L" represents large rotor (L-type), "1+4" represents a preheating time of 1 minute and a rotor rotation time of 4 minutes, and "100° C." indicates that measurement was carried out at a temperature of 100° C.

The 1,4-polybutadiene rubbers may also be blended with natural rubber, polyisoprene rubber, styrene-butadiene rubber, or the like. At least 80% by weight of 1,4-polybutadiene rubber should be present in the base rubber, because base rubbers containing less 1,4-polybutadiene rubber often fail to take advantage of the rebound resilience of the polybutadiene rubber.

Many different types of 1,2 polybutadienes exist, having widely varying physical properties as a result of their differing tacticity, crystallinity, and molecular weight. Examples of 1,2 polybutadienes having differing tacticity, all of which are suitable as unsaturated polymers for use in the present invention, are atactic 1,2 polybutadiene, isotactic 1,2 polybutadiene, and syndiotactic 1,2 polybutadiene. Syndiotactic polymers include alternating base units that are enantiomers of each other. These 1,2 polybutadienes are also differentiated by their crystallinity, which ranges from amorphous 1,2 polybutadienes that essentially lack crystallinity to semi crystalline 1,2 polybutadienes of varying crystallinities. The molecular weights of these 1,2-polybutadienes can also vary greatly. The various combinations of tacticity, crystallinity, and molecular weight provide for many different types of 1,2 polybutadienes having very different processability, as well as other chemical, thermal, mechanical, and theological properties. Syndiotactic 1,2-polybutadiene having a crystallinity suitable for use as an unsaturated polymer in compositions within the scope of the present invention are polymerized from a 1,2 addition of butadiene. Golf balls within the scope of the present invention include syndiotactic 1,2-polybutadiene having crystallinity and greater than about 70% of 1,2 bonds, more preferably greater than about 80% of 1,2-bonds, and most preferably greater than about 90% of 1,2-bonds. Also, golf balls within the scope of the present invention may include syndiotactic 1,2-polybutadiene having a crystallinity between about 5% and about 50%, more preferably between about 10% and about 40%, and most preferably between about 15% and about 30%. In addition, golf balls within the scope of the present invention may include syndiotactic 1,2-polybutadiene having crystallinity and a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls within the scope of the present invention are sold under the trade names RB810, RB820, and RB830 by JSR Corporation of Tokyo, Japan. These have more than 90% of 1,2 bonds, a mean molecular weight of approximately 120,000, and a crystallinity between about 15% and about 30%.

In one embodiment of the invention, the core 12 may comprise a center and one or more core layers disposed around the center. These core layers may be made from the same rubber as is used in the center portion, or they may be a different thermoplastic elastomer. The various core layers (including the center) may each exhibit a different hardness. The Shore D hardness difference between the center hardness and that of the next adjacent layer, as well as the difference in hardness between the various core layers preferably is greater than 2, more preferably is greater than 5, and most preferably is greater than 10 units.

In one preferred embodiment, the hardness of the center and each sequential layer increases progressively outwards from the center to outer core layer.

In another preferred embodiment, the hardness of the center and each sequential layer decreases progressively outwards from the center to the outer core layer.

In one embodiment of the invention, the core 12 may comprise a center and one or more core layers disposed around the center. These core layers may be made from the same rubber as is used in the center, or they may be made from a different thermoplastic elastomer. The various core layers (including the center) may each exhibit a different specific gravity. The specific gravity difference between the center and that of the next adjacent layer, as well as the difference in specific gravity between adjacent ones of the various core layers, preferably is greater than 0.1, and more preferably is greater than 0.2.

In one preferred embodiment, the specific gravity of the center and each sequential layer increases progressively outwards from the center to outer core layer.

In another preferred embodiment, the specific gravity of the center and each sequential layer decreases progressively outwards from the center to the outer core layer.

b) Cross-Linking Agents

Suitable cross-linking agents for use in the golf balls of the present invention include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di (tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Each cross-linking agent has a characteristic decomposition temperature at which 50% of the cross-linking agent has decomposed when subjected to that temperature for a specified time period (t1/2). For example, 1,1-bis-(t-butylperoxy)-3,3,5-tri-methylcyclohexane at t1/2=0.1 hr has a decomposition temperature of 138° C. and 2,5-dimethyl-2,5-di-(t-butylperoxy)hexyne-3 at t1/2=0.1 hr has a decomposition temperature of 182° C. Two or more cross-linking agents having different characteristic decomposition temperatures at the same t1/2 may be blended in the composition. For example, where at least one cross-linking agent has a first characteristic decomposition temperature less than 150° C., and at least one cross-linking agent has a second characteristic decomposition temperature greater than 150° C., the composition weight ratio of the first one cross-linking agent to the second cross-linking agent preferably is in range from 5:95 to 95:5, and more preferably in the range of 10:90 to 50:50.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

c) Co-Cross-Linking Agent

The rubber and cross-linking agent may be blended with a co-cross-linking agent, which may be a metal salt of an unsaturated carboxylic acid. Examples of such metal salts include zinc and magnesium salts of unsaturated fatty acids having 3 to 8 carbon atoms, such as acrylic acid, methacrylic acid, maleic acid, fumaric acid, and palmitic acid, with the zinc salts of acrylic and methacrylic acid being most preferred. The unsaturated carboxylic acid metal salt can be blended in a rubber either as a preformed metal salt, or by introducing an $\alpha,\beta$-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the unsaturated polymer.

d) Peptizer

The compositions used to formulate the cores of the balls of the present invention may also incorporate one or more peptizers. The term "peptizer" is intended to mean chemicals that inhibit cross-linking during the initial processing of unsaturated polymers, but then participate in the cross-linking of the unsaturated polymer after cross-linking has commenced.

The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol and dibenzamido diphenyldisulfide.

Examples of the metal salt of an organic sulfur compound include sodium, potassium, lithium, magnesium, calcium, barium, cesium, and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids, wherein the ammonium cation has the general formula $[NR^1R^2R^3R^4]^+$, where $R^1$, $R^2$, $R^3$, and $R^4$ is either hydrogen, or a $C_1$-$C_{20}$ aliphatic, cycloaliphatic or aromatic moiety, or any and all combinations thereof, with the most preferred being the $NH_4^+$-salt of pentachlorothiophenol.

When the peptizer employed in the cores of the golf balls of the present invention is an organic sulfur compound or a metal salt of an organic sulfur compound, or a non-metal salt of an organic sulfur compound, it is employed in an amount in the range of preferably about 0.01 to about 10, more preferably about 0.10 to about 7, and most preferably about 0.15 to about 5, parts by weight per 100 parts by weight of the unsaturated polymer component.

e) Accelerators

The golf ball composition can comprise one or more accelerators of one or more classes. Accelerators added to an unsaturated polymer increase the vulcanization rate and/or decrease the vulcanization temperature of the unsaturated polymers. Accelerators can be of any class known for rubber processing including mercapto-, sulfenamide-, thiuram, dithiocarbamate, dithiocarbamylsulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in The Vanderbilt Rubber Handbook: 13th Edition (1990, R.T. Vanderbilt Co.), pp. 296-330, in Encyclopedia of Polymer Science and Technology, Vol. 12 (1970, John Wiley & Sons), pp. 258-259, and in Rubber Technology Handbook (1980, Hanser/Gardner Publications), pp. 234-236. Preferred accelerators include 2-mercaptobenzothiazole (MBT) and its salts.

The ball composition can further incorporate in the range of about 0.1 part to about 10 parts by weight of the accelerator per 100 parts by weight of the unsaturated polymer. More preferably, the ball composition can further incorporate about 0.2 part to about 5 parts, and most preferably from about 0.5 part to about 1.5 parts, by weight of the accelerator per 100 parts by weight of the unsaturated polymer Golf balls within the scope of the present invention can be prepared by molding the rubber composition as formulated above into a core of desired size and vulcanizing the rubber by heating. The manufacture of these spheres can be in accord with conventional methods and conditions of manufacture. After the cores have been made, the various inner and outer cover layers are then formed over them.

Cover Layer

With reference again to the FIGURE, the intermediate layer 14 of the golf ball 10 is disposed over the core 12 and an outer cover layer 16 is disposed over the intermediate layer. The composition of the outer cover layer comprises the following components.

The cover layer 16 can comprise one or more ionomer resins or blends thereof. Methods for preparing such ionomers are well known in the art, for example as disclosed in U.S. Pat. No. 3,264,272, the entire contents of which are herein incorporated by reference. Ionomer resins have been long utilized in golf ball formulations and have, to a large extent, replaced balata as the standard golf ball cover stock material. Generally speaking, commercial ionomers consist of a polymer of a mono-olefin, e.g., an alkene, with an unsaturated mono- or dicarboxylic acids having 3 to 12 carbon atoms. An additional monomer in the form of a mono- or dicarboxylic acid ester also may be incorporated in the formulation as a so-called "softening comonomer."

The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $CO^{2+}$, $Ni^{2+}$, $Cu^{2+}$, $Pb^{2+}$, and $Mg^{2+}$, with $Li^+$, $Na^+$, $Zn^{2+}$, and $Mg^{2+}$ being preferred. The basic metal ion salts include, for example, formic acid, acetic acid, nitric acid, carbonic acid, hydrogen carbonate salts, oxides, hydroxides, and alkoxides.

The first commercially available ionomer resins contained up to 16 weight percent acrylic or methacrylic acid, although even at that time, it was well known that, as a general rule, the hardness of these cover materials could be increased with increasing acid content. Thus, in Research Disclosure 29703, published in January, 1989, first disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high-acid ionomers are typically defined as those ionomer resins with acrylic or methacrylic acid units present from 16 wt. % to about 35 wt. % in the polymer. Generally, such high-acid ionomers have a flexural modulus from about 50,000 psi to about 125,000 psi.

Ionomer resins can further comprise a softening comonomer, which is typically present from about 10 wt. % to about 50 wt. % in the polymer. Such ionomers will have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate, and methyl methacrylate.

Today, there are a wide variety of commercially available ionomer resins based both on copolymers of ethylene and (meth)acrylic acid or terpolymers of ethylene and (meth)acrylic acid and (meth)acrylate, all of which may be used as a component of the balls of the present invention. The properties of these ionomer resins can vary widely due to variations in acid content, softening comonomer content, the degree of neutralization, and the type of metal ion used in the neutralization. The full range commercially available typically includes ionomers of polymers of general formula, E/X/Y, where E is ethylene, X is an ethylene/$\alpha,\beta$-ethylenically unsaturated $C_{3-8}$ carboxylic acid copolymer such as ethylene/acrylic or ethylene/methacrylic acid and is present in an amount from about 5 wt. % to about 35 wt. % of the polymer, and Y is a softening comonomer such as $C_1$-$C_8$ acrylate or methacrylate present in an amount of from 0 wt. % to about 50 wt. % of the polymer, and wherein the acid moiety is neutralized from about 1% to about 90%, to form an ionomer with a cation such as lithium, sodium, potassium, magnesium, calcium, barium, lead, tin, zinc or aluminum, or a combination of such cations.

Other examples of ionomers for use as the cover layer of the golf balls of the present invention are ionomers based on the so-called bimodal ionomers, as described in U.S. Pat. No. 6,562,906, the entire contents of which are herein incorporated by reference. These ionomers are bimodal, because they are prepared from blends comprising polymers of different molecular weights. Specifically, they include bimodal polymer blend compositions comprising the following:

a) a high molecular weight component having a molecular weight of about 80,000 to about 500,000 and comprising one or more ethylene/$\alpha$, $\beta$-ethylenically unsaturated $C_{3-8}$ carboxylic acid copolymers and/or one or more ethylene, alkyl(meth)acrylate, (meth)acrylic acid terpolymers; wherein the high molecular weight component is partially neutralized with metal ions selected from the group consisting of lithium, sodium, zinc, calcium, magnesium, and mixtures of any these; and b) a low molecular weight component having a molecular weight of about from about 2,000 to about 30,000 and comprising one or more ethylene/$\alpha,\beta$-ethylenically unsaturated $C_{3-8}$ carboxylic acid copolymers and/or one or more ethylene, alkyl(meth)acrylate, (meth)acrylic acid terpolymers; wherein the low molecular weight component is partially neutralized with metal ions selected from the group consisting of lithium, sodium, zinc, calcium, magnesium, and mixtures of any these.

The cover layer may also comprise one of more of the modified ionomeric polymers, described herein for use in the intermediate layer of the golf balls of the present invention.

It is also understood that the cover layer may also comprise any and all blend combinations of the aforementioned ionomers and/or modified ionomers.

A preferred blend combination for use as the cover layer in the golf balls of the present invention is a blend of the ionomers, bimodal ionomers, or modified ionomeric polymers as described herein, further blended with a zinc neutralized ionomer of a polymer of general formula E/X/Y where E is ethylene, X is a softening comonomer such as an alkyl acrylate or methacrylate and is present in an amount in the range of preferably 0 to about 50, more preferably 0 to about 25, and most preferably 0, and Y is acrylic or methacrylic acid and is present in an amount in the range of preferably about 5 wt. % to about 25, more preferably about 10 to about 25, and most preferably about 10 to about 20 wt %.

In addition, the material used to prepare the outer cover layer(s) of the golf ball of the present invention is not limited to ionomer resins. Other possible materials for use in the cover layer(s) include other thermoplastic resins, thermoset resins, polyurethane resins, polyester resins, polyamide elastomer resins, polyamide-ionomer, polyurethane ionomer, thermoplastic copolyetherester block copolymer, thermoplastic copolyesterester block copolymer, thermoplastic polyurethane, thermoset polyurethane, dynamically vulcanized thermoplastic elastomer, styrene-butadiene, styrene-isoprene and styrene-isoprene elastomers with a functional group such as maleic anhydride or sulfonic acid, and thermoplastic or thermoset metallocene-catalyzed polyolefin resins, and any and all combinations thereof.

Intermediate Layer(s)

With reference again to the FIGURE, the intermediate layer 14 is disposed between the core 12 and the outer cover layer 16. The intermediate layers comprises preferably the following components:

The one or more intermediate layers 14 comprise one or more so-called "modified ionomers," examples of which are described in U.S. Pat. Nos. 6,100,321, 6,329,458, and 6,616,552, and US. Patent Publication US 2003/0158312 A1, the entire contents of all of which are herein incorporated by reference.

Specifically, at least one of the intermediate layers 14 of the golf balls 10 of the present invention comprise one or more modified ionomeric polymers prepared by mixing a) an ionomeric polymer comprising ethylene, 5 to 25 weight percent (meth)acrylic acid, and 0 to 40 weight percent of a $C_1$-$C_8$ (meth)acrylate monomer, wherein the ionomeric polymer is neutralized with metal ions selected from the group consisting of lithium, sodium, zinc, calcium, magnesium, and a mixture of any these, and b) one or more fatty acids or metal salts of a fatty acid, wherein the metal is selected from the group consisting of calcium, sodium, zinc, lithium, barium, and magnesium, and wherein the fatty acid preferably is stearic acid.

The fatty or waxy acid salts utilized in the invention are composed of a chain of alkyl groups containing about 4 to about 75 carbon atoms (usually even numbered) and characterized by a —COOH terminal group. The generic formula for all fatty and waxy acids above acetic acid is $CH_3(CH_2)X$ COOH, wherein the carbon atom count includes the carboxyl group. The fatty or waxy acids utilized to produce the fatty or waxy acid salts incorporated into the invention may be saturated or unsaturated, and they may be present in either solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e. $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$), and lauric acid ($C_{12}$, i.e., $CH_3(CH_2)_{10}COOH$). Examples of suitable unsaturated fatty acids, i.e., a fatty acid having one or more double bonds between the carbon atoms in the alkyl chain, include but are not limited to oleic acid ($C_{13}$, i.e., $CH_3(CH_2)_7CH:CH(CH_2)_7COOH$).

The source of the metal ions used to produce the metal salts of the fatty or waxy acid salts also incorporated into the invention are generally various metal salts that provide the metal ions capable of neutralizing, to various extents, the carboxylic acid groups of the fatty acids. These include the sulfate, carbonate, acetate, and hydroxylate salts of zinc, barium, calcium, and magnesium.

Because the fatty acid salts utilized in the invention comprise various combinations of fatty acids neutralized with a large number of different metal ions, several different types of fatty acid salts may be utilized in the invention, including metal stearates, laureates, oleates, and palmitates, with calcium, zinc, sodium, and magnesium stearate being preferred, and with calcium and sodium stearate being most preferred.

The fatty or waxy acid or metal salt of the fatty or waxy acid is present in the modified ionomeric polymers in an amount in the range of preferably about 5 to about 45, more preferably about 7 to about 35, and most preferably about 8 to about 20, weight percent (based on the total weight of the modified ionomeric polymer).

As a result of the addition of the one or more metal salts of a fatty or waxy acid, preferably about 40 to 100, more preferably about 50 to 100, and most preferably about 70 to 100, percent of the acidic groups in the final modified ionomeric polymer composition are neutralized by a metal ion.

An example of such a modified ionomer polymer is DuPont® HPF-1000, available from E. I duPont de Nemours and Co. Inc.

Other examples of modified ionomeric polymers for use as the intermediate layer of the golf balls of the present invention are those prepared by modifying (again with one or more metal salts of a fatty or waxy acid) ionomers based on the so-called bimodal ethylene/carboxylic acid polymers as described in U.S. Pat. No. 6,562,906, the entire contents of which are herein incorporated by reference. These polymers are bimodal, because they result from blending two polymers of different molecular weights. The modified bimodal ionomeric polymers comprise:

a high molecular weight component having a molecular weight of about 80,000 to about 500,000 and comprising one or more ethylene/$\alpha,\beta$-ethylenically unsaturated $C_{3-8}$ carboxylic acid copolymers and/or one or more ethylene, alkyl(meth)acrylate, (meth)acrylic acid terpolymers; wherein the high molecular weight component is partially neutralized with metal ions selected from the group consisting of lithium, sodium, zinc, calcium, magnesium, and mixtures of any of these; and a low molecular weight component having a molecular weight of about 2,000 to about 30,000 and comprising one or more ethylene/$\alpha,\beta$-ethylenically unsaturated $C_{3-8}$ carboxylic acid copolymers and/or one or more ethylene, alkyl(meth)acrylate, (meth)acrylic acid terpolymers; wherein the low molecular weight component is partially neutralized with metal ions selected from the group consisting of lithium, sodium, zinc, calcium, magnesium, and mixtures of any of these; and about 5 to about 45 weight percent (based on the total weight of the modified ionomeric polymer) of one or more fatty acids or metal salts of a fatty acid wherein the metal is selected from the group consisting of calcium, sodium, zinc, lithium, barium, and magnesium, and wherein the fatty acid preferably is stearic acid.

Again, the fatty or waxy acid salts utilized in the modified bimodal ionomeric polymers are composed of a chain of alkyl groups containing about 4 to about 75 carbon atoms (usually even numbered) and characterized by a —COOH terminal group. The generic formula for all fatty or waxy acids above acetic acid is $CH_3(CH_2)X\,COOH$, wherein the carbon atom count includes the carboxyl group. The fatty or waxy acids utilized to produce the fatty or waxy acid salts incorporated into the invention may be saturated or unsaturated, and they may be present in either solid, semi-solid, or liquid form.

Examples of suitable saturated fatty acids, i.e., fatty acids in which the carbon atoms of the alkyl chain are connected by single bonds, include but are not limited to stearic acid ($C_{18}$, i.e., $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$), and lauric acid ($C_{12}$, i.e., $CH_3(CH_2)_{10}COOH$). Examples of suitable unsaturated fatty acids, i.e., a fatty acid having one or more double bonds between the carbon atoms in the alkyl chain, include but are not limited to oleic acid ($C_{13}$, i.e., $CH_3(CH_2)_7CH{:}CH(CH_2)_7COOH$).

The source of the metal ions used to produce the metal salts of the fatty or waxy acid salts also incorporated into the invention generally are various metal salts that provide the metal ions capable of neutralizing, to various extents, the carboxylic acid groups of the fatty acids. These include the sulfate, carbonate, acetate, and hydroxylate salts of zinc, barium, calcium, and magnesium.

Because the fatty or waxy acid salts utilized in the invention comprise various combinations of fatty or waxy acids neutralized with a large number of different metal ions, several different types of fatty acid salts may be utilized in the invention, including metal stearates, laureates, oleates, and palmitates, with calcium, zinc, sodium, and magnesium stearate being preferred, and with calcium and sodium stearate being most preferred.

The fatty or waxy acid or metal salt of the fatty or waxy acid in the modified bimodal ionomeric polymers is present in an amount of preferably about 5 to about 45, more preferably about 7 to about 35, and most preferably about 8 to about 20, weight percent (based on the total weight of the modified ionomeric polymer).

Again, as a result of the addition of the fatty or waxy acids or one or more metal salts of a fatty or waxy acid, preferably about 40 to 100, more about 50 to 100, and most preferably about 70 to 100, percent of the acidic groups in the final modified bimodal ionomeric polymer composition are neutralized by a metal ion.

In a preferred embodiment the modified ionomeric polymer composition further comprises a zinc-neutralized ionomer of a polymer having the general formula E/X/Y, where E is ethylene, X is a softening comonomer such as an alkyl acrylate or methacrylate and is present in an amount of preferably 0 to about 50 wt. %, more preferably 0 to about 25 wt. %, and most preferably 0 wt. %, and Y is acrylic or methacrylic acid and is present in an amount of preferably about 5 to about 25 wt. %, more preferably about 10 to about 25 wt. %, and most preferably about 10 to about 20 wt. %.

Any additional intermediate layers beyond the at least one layer comprising the material described above can comprise addition modified ionomeric polymers or any materials as described herein for use in the cover layer of the balls of the present invention.

Additional Materials

In addition to the materials discussed above, the core, intermediate layer, and/or the outer cover layer of the golf ball of the present invention can further incorporate one or more additional polymers. Examples of suitable additional polymers include, but are not limited to, the following: thermoplastic elastomer, thermoset elastomer, synthetic rubber, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species.

Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as $\epsilon$-caprolactam or $\omega$-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include nylon 6, nylon 66, nylon 610, nylon 612, nylon 11, nylon 12, copolymerized nylon, nylon MXD6, and nylon 46.

Other preferred materials suitable for use as an additional material in compositions within the scope of the present invention include polyester elastomers marketed under the trademark SKYPEL™ by SK Chemicals, of South Korea, or diblock or triblock copolymers marketed under the trademark SEPTON™ by Kuraray Corporation, of Kurashiki, Japan, and KRATON™ by Kraton Polymers Group of Companies, of Chester, United Kingdom. All of the materials listed above can provide for particular enhancements to ball layers prepared within the scope of the present invention.

The various polymer compositions used to prepare the golf balls of the present invention can also incorporate one or more fillers. Such fillers are typically in a finely divided form, for example, in a size preferably less than about 20 mesh, and more preferably less than about 100 mesh, U.S. standard size, except for fibers and flock, which are generally elongated. Flock and fiber sizes should be small enough to facilitate processing. Filler particle size will depend upon desired effect, cost, ease of addition, and dusting considerations. The appropriate amounts of filler required will vary depending on the application, but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler comprises a continuous or non-continuous fiber. In another preferred embodiment the filler is employed in the composition used to prepare the inner cover layer and has a higher density than that of the modified ionomeric polymer component of the inner cover layer.

If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls. The appropriate amounts for these materials can be readily determined without undue experimentation.

Preparation of Golf Balls

Typically the golf ball core is made by mixing together the unsaturated polymer, cross-linking agents, and other additives with or without melting them. Dry blending equipment, such as a tumbler mixer, V blender, ribbon blender, or two-roll mill, can be used to mix the compositions. The golf ball compositions can also be mixed using a mill, internal mixer such as a Banbury or Farrel continuous mixer, extruder or combinations of these, with or without application of thermal energy to produce melting. The various core components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing. If radiation is a cross-linking agent, then the mixture comprising the unsaturated polymer and other additives can be irradiated following mixing, during forming into a part such as the core of a ball, or after forming.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide and peptizer selected. The molding cycle may have a single step of molding the mixture at a single temperature for fixed time duration.

For example, a preferred mode of preparation for the cores used in the present invention is to first mix the core ingredients on a two-roll mill, to form slugs of approximately 30-40 g, and then compression-mold in a single step at a temperature between 150 to 180° C., for a time duration between 5 and 12 minutes.

The various core components may also be combined to form a golf ball by an injection molding process, which is also well known to one of ordinary skill in the art. The curing time depends on the various materials selected, and those of ordinary skill in the art will be readily able to adjust the curing time upward or downward based on the particular materials used and the discussion herein.

The various formulations for the intermediate layer and/or cover layer may be produced using a twin-screw extruder or may be blended manually or mechanically prior to the addition to the injection molder feed hopper. Finished golf balls may be prepared by initially positioning the solid, preformed core in an injection-molding cavity, followed by uniform injection of the intermediate layer and/or cover layer composition sequentially over the core. The cover formulations can be injection molded around the cores to produce golf balls of the required diameter.

Alternatively, the cover layers may also be formed around the core by first forming half shells by injection molding followed by compression molding the half shells about the core to form the final ball.

Covers may also be formed around the cores using compression molding. Cover materials for compression molding may also be extruded or blended resins or castable resins such as polyurethane.

Ball Construction Properties

The core 12 of the golf ball 10 of the present invention has a diameter of preferably about 1.20 to about 1.56 in., more preferably about 1.40 to about 1.52 in., and most preferably about 1.45 to about 1.50 in. The core also has a PGA compression of preferably about 40 to about 90, more preferably about 40 to about 85, and most preferably about 40 to about 80.

The intermediate layer 14 of the golf ball 10 of the present invention has a thickness of preferably about 0.01 to about 0.10 in., more preferably about 0.02 to about 0.08 in., and most preferably about 0.03 to about 0.06 in. The intermediate layer also has a Shore D hardness in the range of preferably about 30 to about 75, more preferably about 40 to about 70, and most preferably about 40 to about 65. The intermediate layer also has an average acid content of about 5 to about 25 wt. % (based on the total weight of the intermediate layer composition).

The cover layer 16 of the golf ball 10 of the present invention has a thickness in the range of preferably about 0.01 to about 0.10 in., more preferably about 0.02 to about 0.08 in., and most preferably about 0.03 to about 0.06 in. The cover layer also has a Shore D hardness in the range of preferably about 40 to about 70, more preferably about 45 to about 70, and most preferably 50 to about 70.

The C.O.R. of the golf balls 10 of the present invention preferably is greater than about 0.790, more preferably is greater than about 0.795, and most preferably is greater than about 0.800, at an inbound velocity of 125 ft/sec.

EXAMPLES

Examples of the invention are given below by way of illustration and not by way of limitation.

Core Components and Preparation

A series of ball cores having diameters of 1.48 in., and suitable for use in golf balls within the scope of the present invention were prepared. Each core used the following materials:

BR40 is a cis-1,4-polybutadiene rubber made with a rare earth catalyst and is commercially available from Enichem (Italy).

ZnO is a rubber grade zinc oxide commercially available from Akrochem (Akron, Ohio).

ZDA is zinc diacrylate and is commercially available from Sartomer. Several grades are available, which may be used interchangeably or in combination.

Varox 231XL is 1,1-di(t-butylperoxy)-3,3,5-trimethyl-cyclohexane is a cross-linking initiator (40% active peroxide). This is commercially available from R.T. Vanderbilt (Norwalk, Conn.).

The cores each incorporated as the base rubber, cis-1,4-polybutadiene. Additionally, the cores incorporated zinc oxide, zinc diacrylate, and a peroxide cross-linking initiator.

The core ingredients were mixed on a two-roll mill, and slugs of approximately 34.5 g were formed and compression-molded at 170° C. for seven minutes. The resulting cores were then tested for C.O.R. and PGA compression after one day of aging at room temperature. Detailed composition information for the cores is provided below in Table 1.

TABLE 1

| BR40 (pph*) | ZnO (pph) | ZDA (pph) | Varox 231XL (pph)** |
|---|---|---|---|
| 100 | 26 | 30 | 0.8 |

*pph = parts per hundred of unsaturated polymer
**active peroxide = 0.32 pph

Inner and Outer Cover Layer Components

The materials employed in the blend formulations used for the inner cover layer and/or the outer cover layer were as follows:

DuPont® HPF-1000 is a grade of polymer commercially available from DuPont having a melt flow index (as measured by ASTM D1238, 190° C./2.16 kg) of 0.65 g/10 min and a density (ASTM D1003) of 0.96 g/cm$^3$.

Septon HG 252 is a triblock copolymer having polystyrene end blocks and a hydrogenated polyisoprene midblock and has hydroxyl groups at the end of the polystyrene blocks. HG-252 is commercially available from Kuraray America Inc. (Houston, Tex.).

Pebax® 3533 is a polyether amide block copolymer commercially available from Atofina.

Surlyn® 9120 is a grade of ionomer commercially available from DuPont, and it is a zinc ionomer of an ethylene/methacrylic acid polymer.

Surlyn® 8140 is a grade of ionomer commercially available from DuPont, and it is a sodium ionomer of an ethylene/methacrylic acid polymer.

Surlyn® 8320 is a grade of ionomer commercially available from DuPont, and it is a sodium ionomer of an ethylene/methacrylic acid/methacrylate polymer.

In addition, a color concentrate ("CC") was used in some of the blend formulations. It consisted of 50 wt. % TiO2 and 50 wt. % of a thermoplastic binder. Such a concentrate is commercially available from Carolina Color Corporation.

Intermediate and Cover Material Preparation

By blending the ingredients set forth in the Table 2 below, a series of plastic formulations for use in either the intermediate layer or the cover layer were produced using a twin-screw extruder.

Final Ball Preparation

Finished golf balls were prepared by positioning the solid, preformed cross-linked polybutadiene core in an injection molding cavity, followed by uniform injection of the selected intermediate layer or cover layer composition sequentially over the core. The intermediate and cover layer formulations were injection-molded around the identical solid type cores of finished diameter of 1.48 inches, to produce golf balls of approximately 1.680 inches in diameter having the ball constructions and properties as summarized in Table 2.

The ball's dimple pattern included 442 dimples.

The properties of PGA compression, coefficient of restitution (C.O.R.), Shore D hardness, and other tests on either the materials or the resulting balls were conducted using the test methods as defined below.

Core or ball diameter was determined by using standard linear calipers or size gauge.

Core specific gravity was determined by electronic densimeter using ASTM D-792.

Compression was measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, then the compression is rated at 100; if the spring compresses 0.1 inch, then the compression value is rated as 0. Thus, more compressible, softer materials will have lower Atti gauge values than will harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

Thus, a Riehle compression of 100 would be the same as an Atti compression of 60.

Coefficient of restitution (C.O.R.) of the cores or balls was measured using an air cannon to fire the core or ball, at an inbound velocity of 125 feet per second, against a steel plate positioned 81 inches from the cannon's muzzle. The rebound velocity was then measured via a timing mechanism using three light gates. The rebound velocity was divided by the inbound velocity to yield the coefficient of restitution.

Shore D hardness was measured in accordance with ASTM Test D2240, except that the hardness was determined perpendicular to the curved surface of the core or on the land area between dimples on the surface of the ball.

The ball performance was determined using a Robot Driver Test, which utilized a commercial swing robot in conjunction with an optical system to measure ball speed, launch angle, and backspin. In this test, a titanium driver was attached to a swing robot, and the swing speed and power profile, as well as the tee location and club lie angle, were set-up to generate the values set forth below. A Maxfli XS Tour golf ball was used as a reference:

Headspeed: 112 mph
Ballspeed: 160 mph
Launch Angle: 9 deg
Backspin: 3200 rpm

The test ball was substituted for the reference ball and the corresponding values determined as summarized in Table 2. Example 1 and Comparative Example 1 both shared the same core and cover compositions, and both had a similar cover hardness of 62 Shore D. Similarly, Example 2 and Comparative 2 both shared the same core and cover compositions, and both had a similar cover hardness of 58 Shore D and similar PGA ball compression.

Comparison of the resulting ball performance data in Table 2 demonstrates that both Examples 1 and 2 had higher driver speed and higher C.O.R. than did Comparative Examples 1 and 2, respectively, despite having the identical core compression and C.O.R. and having identical cover hardnesses.

Thus the combination of the use of a modified ionomeric polymer in an inner cover layer of the specified hardness and thickness in a multi-layer golf ball, allows production of a ball having increased driver velocity, and lower driver spin (hence improved distance) for a given core compression and outer cover layer hardness, thereby maintaining the ball feel.

TABLE 2

|  | Ex 1 | Ex 2 | Comp Ex 1 | Comp Ex 2 |
|---|---|---|---|---|
| Core diameter (in) | 1.48 | 1.48 | 1.48 | 1.48 |
| Core Specific Gravity | 1.19 | 1.19 | 1.19 | 1.19 |
| Core Compression (PGA) | 70 | 70 | 70 | 70 |
| Core C.O.R. | 0.80 | 0.80 | 0.80 | 0.80 |
| Inter. Layer Comp. (wt. %) | DuPont ® HPF-1000 (100) | DuPont ® HPF-1000 (100) | Pebax ® 3533 (70) Surlyn ® 9120 (15) Surlyn ® 8140 (15) | Pebax ® 3533 (70) Surlyn ® 9120 (15) Surlyn ® 8140 (15) |
| Inter. Layer Thickness (in.) | 0.050 | 0.050 | 0.050 | 0.050 |
| Inter. Layer Hardness (Shore D) | 50 | 50 | 40 | 40 |
| Cover Layer Comp. (wt. %) | Surlyn ® 8140 (30) Surlyn ® 9120 (30) Surlyn ® 8320 (35) CC (5) | Surlyn ® 8140 (22) Surlyn ® 9120 (22) Surlyn ® 8320 (48) HG 252 (3) CC (5) | Surlyn ® 8140 (30) Surlyn ® 9120 (30) Surlyn ® 8320 (35) CC (5) | Surlyn ® 8140 (22) Surlyn ® 9120 (22) Surlyn ® 8320 (48) HG 252 (3) CC (5) |
| Cover Layer Thickness (in.) | 0.050 | 0.050 | 0.050 | 0.050 |
| Cover Layer Hardness (Shore D) | 62 | 58 | 62 | 58 |
| Ball Pole Size (in) | 1.685 | 1.685 | 1.685 | 1.685 |
| Ball Equator Size (in) | 1.685 | 1.685 | 1.685 | 1.685 |
| Ball Compression (PGA) | 85-90 | 80-85 | 80-85 | 75-80 |
| Ball C.O.R. | 0.810-0.815 | 0.805-0.810 | 0.800 | 0.792 |
| Driver Ball Speed (mph) | 163.7 | 163.1 | 162.8 | 161.8 |
| Driver Ball Launch angle (°) | 9.2 | 9.3 | 9.2 | 8.9 |
| Driver Ball Spin (rpm) | 3000 | 3000 | 3050 | 3250 |

We claim:

1. A golf ball comprising:
  a. a core, wherein said core comprises a center and one or more layers disposed around said center, and wherein the difference between the hardness of one layer and the next adjacent layer is greater than 2 Shore D units;
  b. an intermediate layer; and
  c. a cover layer;
  d. wherein said intermediate layer comprises a modified ionomeric polymer comprising:
    a bimodal polymer blend composition comprising:
      (1) a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; said high molecular weight component being partially neutralized with metal ions selected from the group consisting of lithium, sodium, zinc, calcium, magnesium, and a mixture of any these, and
      (2) a low molecular weight component having a molecular weight of about from about 2,000 to about 30,000 and comprising one or more ethylene/ α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and a mixture of any these, and
      (3) about 5 to about 45 weight percent (based on the total weight of said modified ionomeric polymer) of a fatty acid or one or more metal salts of said fatty acid;
    wherein about 40 to 100 percent of the acid groups present in said modified ionomeric polymer are neutralized with zinc, sodium, lithium, calcium, or magnesium ions, or a combination thereof;
  e. wherein said core has a diameter in the range of about 1.20 to about 1.56 in, and a PGA compression in the range of about 40 to about 90;
  f. wherein said intermediate layer has a thickness in the range of about 0.01 to about 0.10 in, and a Shore D hardness in the range of about 30 to about 75;
  g. wherein said cover layer has a Shore D hardness in the range of about 40 to about 70; and
    wherein the golf ball has a coefficient of restitution greater than 0.800, at 125 ft/sec inbound velocity.

2. The golf ball of claim 1, wherein:
  a. said core has a diameter in the range of about 1.40 to about 1.52 in, and a PGA compression in the range of about 40 to about 85;
  b. said modified ionomeric polymer present in the intermediate layer comprises about 7 to about 35 weight percent (based on the total weight of said modified ionomeric polymer) of said one or more fatty acids or metal salts of a fatty acid, said metal being selected from the group consisting of calcium, sodium, zinc, lithium, magnesium, barium, and combinations thereof;
  c. about 50 to 100 percent of the acid groups present in said modified ionomeric polymer present in the intermediate layer are neutralized with zinc, sodium, lithium, calcium, or magnesium ions, or a combination thereof;
  d. said intermediate layer has a thickness in the range of about 0.02 to about 0.08 in and a Shore D hardness in the range of about 40 to about 70; and
  e. said cover layer has a Shore D hardness in the range of about 45 to about 70.

3. The golf ball of claim 1, wherein:
  a. said core has a diameter of about 1.45 to about 1.50 in, and a PGA compression of about 40 to about 80;
  b. the modified ionomeric polymer present in said intermediate layer comprises about 8 to about 20 weight percent (based on the total weight of the modified ionomeric polymer) of one or more or metal salts of stearic acid, said metal being selected from the group consisting of calcium, sodium, zinc, lithium, magnesium, barium, and combinations thereof;
c. about 70 to 100 percent of the acid groups present in said modified ionomeric polymer of said intermediate layer are neutralized with zinc, sodium, lithium, calcium, or magnesium ions, or a combination thereof;
d. said intermediate layer has a thickness in the range of about 0.03 to about 0.06 in., a Shore D hardness in the range of about 40 to about 65, and an average acid content of in the range of about 5 to about 25 weight percent; and
e. said cover layer has a Shore D hardness in the range of about 50 to about 70.

4. The golf ball of claim 1, wherein said modified ionomeric polymer further comprises a zinc-neutralized ionomer of a polymer having the general formula E/X/Y, where E is ethylene, X is an alkyl(meth)acrylate present in an amount in the range of 0 to about 50 weight percent (based on the total weight of said zinc-neutralized ionomer), and Y is (meth) acrylic acid present in an amount in the range of about 5 to about 25 weight percent (based on the total weight of said zinc-neutralized ionomer).

5. The golf ball according to claim 1, wherein said core comprises:
a. at least one unsaturated polymer;
b. at least one cross-linking agent; and
c. at least one co-cross-linking agent.

6. The golf ball according to claim 5, wherein:
a. said unsaturated polymer has a Mooney viscosity ($ML_{1+4}$ (100° C.)) in the range of about 20 to about 80 and is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, polyurethane, and combinations thereof; and
b. said cross-linking agent is present in an amount in the range of about 0.05 to about 5 parts by weight of the cross-linking agents per 100 parts by weight of the unsaturated polymer.

7. The golf ball according to claim 6, wherein said core further comprises a peptizer comprising an organic sulfur compound, a metal salt of an organic sulfur compound, and/or a non-metal salt of an organic sulfur compound.

8. The golf ball according to claim 7, wherein said core comprises:
a. a first cross-linking agent having a first characteristic decomposition temperature less than 150° C. for a $t_{1/2}$ equal to 0.1 hour; and
b. a second cross-linking agent having a second characteristic decomposition temperature greater than 150° C. for a $t_{1/2}$ equal to 0.1 hour.

9. The golf ball according to claim 8, wherein the composition weight ratio of the first cross-linking agent to the second cross-linking agent is in the range of 5:95 to 95:5.

10. The golf ball according to claim 8, wherein the composition weight ratio of the first cross-linking agent to the second cross-linking agent is in the range of 10:90 to 50:50.

11. The golf ball according to claim 6, wherein said core further comprises an accelerator present in an amount in the range of about 0.1 to about 10 parts by weight per 100 parts by weight of said unsaturated polymer.

12. The golf ball according to claim 6, wherein said core further comprises a filler selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, calcium carbonate, magnesium carbonate, barium carbonate, calcium sulfate, magnesium sulfate, barium sulfate, tungsten, steel, copper, cobalt or iron, metal alloys, tungsten carbide, metal oxides, metal stearates, particulate carbonaceous materials, and any and all combinations thereof.

13. The golf ball according to claim 5, wherein:
a. said unsaturated polymer is cis-1,4-polybutadiene and has a Mooney viscosity ($M_{1+4}$ (100° C.)) in the range of about 30 to about 70; and
b. said cross-linking agent is present in an amount in the range of about 0.2 to about 3 parts by weight per 100 parts by weight of the unsaturated polymer.

14. The golf ball according to claim 13, wherein said core further comprises a peptizer comprising:
a. an organic sulfur compound or metal salt of an organic sulfur compound, present in an amount in the range of about 0.01 to about 10 parts by weight per 100 parts by weight of the unsaturated polymer; or
b. a non-metal salt of an organic sulfur compound, present in an amount in the range of about 0.01 to about 10 parts by weight per 100 parts by weight of the unsaturated polymer.

15. The golf ball according to claim 13, wherein said core further comprises an accelerator present in an amount in the range of about 0.2 to about 5 parts by weight per 100 parts by weight of the unsaturated polymer.

16. The golf ball according to claim 5, wherein:
a. said unsaturated polymer is cis-1,4-polybutadiene and has a Mooney viscosity (ML1+4 (100° C.)) in the range of about 35 to about 50; and
b. said cross-linking agent is present in an amount in the range of about 0.2 to about 2 parts by weight per 100 parts by weight of the unsaturated polymer.

17. The golf ball according to claim 16, wherein said core further comprise a peptizer comprising:
a. pentachlorothiophenol, dibenzamido diphenyldisulfide, or a metal salt of pentachlorothiophenol, present in an amount in the range of about 0.10 to about 7 parts by weight per 100 parts by weight of the unsaturated polymer; or
b. an ammonium salt of pentachlorothiophenol, with the ammonium cation having the general cycloaliphatic or aromatic system, or a combination thereof, present in an amount in the range of about 0.1 to about 7 parts by weight per 100 parts by weight of the unsaturated polymer.

18. The golf ball according to claim 17, wherein said peptizer is pentachlorothiophenol, or the zinc salt of pentachlorothiophenol, and is present in an amount in the range of about 0.15 to about 5 parts by weight per 100 parts by weight of said unsaturated polymer.

19. The golf ball according to claim 17, wherein said peptizer is the $NH_4^+$ salt of pentachlorothiophenol, present in amount in the range of about 0.15 to about 5 parts by weight per 100 parts by weight of the unsaturated polymer.

20. The golf ball according to claim 16, wherein said core further comprises an accelerator present in an amount in the range of about 0.5 to about 1.5 parts by weight per 100 parts by weight of the unsaturated polymer, and wherein the accelerator is selected from the group consisting of 2-mercaptobenzothiazole and a salt of 2-mercaptobenzothiazole.

21. The golf ball according to claim 5, wherein said core comprises:
   a. a first cross-linking agent having a first characteristic decomposition temperature less than 150° C. for a t1/2 equal to 0.1 hour; and
   b. a second cross-linking agent having a second characteristic decomposition temperature greater than 150° C. for a $t_{1/2}$ equal to 0.1 hour.

22. The golf ball according to claim 21, wherein the composition weight ratio of the first cross-linking agent to the second cross-linking agent is in the range of 5:95 to 95:5.

23. The golf ball according to claim 21, wherein the composition weight ratio of the first cross-linking agent to the second cross-linking agent is in the range of 10:90 to 50:50.

24. The golf ball of claim 1, wherein said cover layer further comprises a zinc-neutralized ionomer of a polymer having the general formula E/X/Y, where E is ethylene, X is an alkyl(meth)acrylate present in an amount in the range of 0 to about 50 weight percent (based on the total weight of said zinc-neutralized ionomer), and Y is (meth)acrylic acid present in an amount in the range of about 5 to about 25 weight percent (based on the total weight of said zinc-neutralized ionomer).

25. The golf ball according to claim 1, wherein one or more of said core, said intermediate layer, or said cover layer further comprises a polymer selected from the group consisting of thermoplastic elastomers, thermoset elastomers, synthetic rubber, thermoplastic vulcanizates, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane, or any metallocene-catalyzed polymers of these species.

26. The golf ball according to claim 1, wherein the specific gravity increases outwards, from the center to the outermost core layer.

27. The golf ball according to claim 1, wherein the specific gravity decreases outwards, from the center to the outermost core layer.

28. The golf ball according to claim 1, wherein said core comprises a center and one or more layers disposed around said center, and wherein the difference between the specific gravity of one layer and the next adjacent layer is greater than 0.1.

29. The golf ball according to claim 28, wherein said cover layer further comprises a zinc-neutralized ionomer of a polymer having the general formula E/X/Y, where E is ethylene, X is an alkyl(meth)acrylate present in an amount in the range of 0 to about 50 weight percent (based on the total weight of said zinc-neutralized ionomer), and Y is (meth)acrylic acid present in an amount in the range of about 5 to about 25 weight percent (based on the total weight of said zinc-neutralized ionomer).

30. A golf ball comprising:
   a. a core;
   b. an intermediate layer; and
   c. a cover layer;
   d. wherein said intermediate layer comprises a modified ionomeric polymer comprising:
      a bimodal polymer blend composition comprising:
      (1) a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; said high molecular weight component being partially neutralized with metal ions selected from the group consisting of lithium, sodium, zinc, calcium, magnesium, and a mixture of any these, and
      (2) a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and a mixture of any these, and
      (3) about 5 to about 45 weight percent (based on the total weight of said modified ionomeric polymer) of a fatty acid or one or more metal salts of said fatty acid;
         wherein about 40 to 100 percent of the acid groups present in said modified ionomeric polymer are neutralized with zinc, sodium, lithium, calcium, or magnesium ions, or a combination thereof;
   e. wherein said core has a diameter in the range of about 1.20 to about 1.56 in., a PGA compression in the range of about 40 to about 90, and comprises (i) at least one unsaturated polymer; (ii) at least one cross-linking agent; and (iii) at least one co-cross-linking agent, wherein said unsaturated polymer is cis-1,4-polybutadiene and has a Mooney viscosity (ML1+4 (100° C.)) in the range of about 35 to about 50; and said cross-linking agent is present in an amount in the range of about 0.2 to about 2 parts by weight per 100 parts by weight of the unsaturated polymer, and wherein said core further comprises a peptizer comprising a $NH_4^+$ salt of pentachlorothiophenol, present in amount in the range of about 0.15 to about 5 parts by weight per 100 parts by weight of the unsaturated polymer;
   f. wherein said intermediate layer has a thickness in the range of about 0.01 to about 0.10 in, and a Shore D hardness in the range of about 30 to about 75;
   g. wherein said cover layer has a Shore D hardness in the range of about 40 to about 70; and
      wherein the golf ball has a coefficient of restitution greater than 0.800, at 125 ft/sec inbound velocity.

31. The golf ball of claim 30, wherein:
   a. said core has a diameter in the range of about 1.40 to about 1.52 in, and a PGA compression in the range of about 40 to about 85;
   b. said modified ionomeric polymer present in the intermediate layer comprises about 7 to about 35 weight percent (based on the total weight of said modified ionomeric polymer) of said one or more fatty acids or metal salts of a fatty acid, said metal being selected from the group consisting of calcium, sodium, zinc, lithium, magnesium, barium, and combinations thereof;
   c. about 50 to 100 percent of the acid groups present in said modified ionomeric polymer present in the intermediate layer are neutralized with zinc, sodium, lithium, calcium, or magnesium ions, or a combination thereof;
d. said intermediate layer has a thickness in the range of about 0.02 to about 0.08 in and a Shore D hardness in the range of about 40 to about 70; and
e. said cover layer has a Shore D hardness in the range of about 45 to about 70.

32. A golf ball comprising:
a. a core, wherein said core comprises a center and one or more layers disposed around said center, and wherein the difference between the specific gravity of one layer and the next adjacent layer is greater than 0.1;
b. an intermediate layer; and
c. a cover layer;
d. wherein said intermediate layer comprises a modified ionomeric polymer comprising:
   a bimodal polymer blend composition comprising:
   (1) a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; said high molecular weight component being partially neutralized with metal ions selected from the group consisting of lithium, sodium, zinc, calcium, magnesium, and a mixture of any these, and
   (2) a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; said low molecular weight component being partially neutralized with metal ions selected from the group consisting of lithium, sodium, zinc, calcium, magnesium, and a mixture of any these, and
   (3) about 5 to about 45 weight percent (based on the total weight of said modified ionomeric polymer) of a fatty acid or one or more metal salts of said fatty acid;
      wherein about 40 to 100 percent of the acid groups present in said modified ionomeric polymer are neutralized with zinc, sodium, lithium, calcium, or magnesium ions, or a combination thereof;
e. wherein said core has a diameter in the range of about 1.20 to about 1.56 in, and a PGA compression in the range of about 40 to about 90;
f. wherein said intermediate layer has a thickness in the range of about 0.01 to about 0.10 in, and a Shore D hardness in the range of about 30 to about 75;
g. wherein said cover layer has a Shore D hardness in the range of about 40 to about 70; and
   wherein the golf ball has a coefficient of restitution greater than 0.800, at 125 ft/sec inbound velocity.

33. The golf ball of claim 32, wherein:
a. said core has a diameter in the range of about 1.40 to about 1.52 in, and a PGA compression in the range of about 40 to about 85;
b. said modified ionomeric polymer present in the intermediate layer comprises about 7 to about 35 weight percent (based on the total weight of said modified ionomeric polymer) of said one or more fatty acids or metal salts of a fatty acid, said metal being selected from the group consisting of calcium, sodium, zinc, lithium, magnesium, barium, and combinations thereof;
c. about 50 to 100 percent of the acid groups present in said modified ionomeric polymer present in the intermediate layer are neutralized with zinc, sodium, lithium, calcium, or magnesium ions, or a combination thereof;
d. said intermediate layer has a thickness in the range of about 0.02 to about 0.08 in and a Shore D hardness in the range of about 40 to about 70; and
e. said cover layer has a Shore D hardness in the range of about 45 to about 70.

* * * * *

UNITED STATES PATENT AND TRADEMARK OFFICE
CERTIFICATE OF CORRECTION

PATENT NO. : 8,119,714 B2
APPLICATION NO. : 12/708414
DATED : February 21, 2012
INVENTOR(S) : Dean A. Snell, Hyun Jin Kim and Eric Loper It is certified that error appears in the above-identified patent and that said Letters Patent is hereby corrected as shown below:

In the Specification:

At column 13, line 53, "$CO^{2+}$," should read --$Co^{2+}$,--.

Signed and Sealed this
Eighth Day of December, 2015

Michelle K. Lee
*Director of the United States Patent and Trademark Office*